United States Patent

Geis

[11] Patent Number: 6,142,042
[45] Date of Patent: Nov. 7, 2000

[54] ATTACHING-DETACHING TOOL

[75] Inventor: Helmut Geis, Mittelstreu, Germany

[73] Assignee: Preh-Werke GmbH & Co. KG, Bad Neustadt/Saale, Germany

[21] Appl. No.: 09/266,000

[22] Filed: Mar. 11, 1999

[30] Foreign Application Priority Data

Mar. 12, 1998 [DE] Germany .......................... 198 10 743

[51] Int. Cl.[7] .................................................. B25B 13/02
[52] U.S. Cl. ............................................ 81/119; 81/125.1
[58] Field of Search ................... 81/119, 121.1, 81/125.1

[56] References Cited

U.S. PATENT DOCUMENTS

| 1,109,032 | 9/1914 | Bersted | 81/119 |
|---|---|---|---|
| 2,179,396 | 11/1939 | Barrington . | |
| 2,196,701 | 4/1940 | Homsher | 81/125.1 |
| 3,376,766 | 4/1968 | Vienat | 81/125.1 |
| 4,089,077 | 5/1978 | Morton . | |
| 5,136,902 | 8/1992 | Ma | 81/125.1 |

FOREIGN PATENT DOCUMENTS

| 34 35 241 A1 | 4/1986 | Germany . |
|---|---|---|
| 94 11 104 | 10/1994 | Germany . |

*Primary Examiner*—David A. Scherbel
*Assistant Examiner*—Joni B. Danganan
*Attorney, Agent, or Firm*—Birch, Stewart, Kolasch & Birch, LLP

[57] ABSTRACT

Interlocking clamps for protective shields currently available generally allow detachment from one side only. An attaching-detaching tool of this invention, by contrast, is structured with a flat edge profile (13) having a thickness less than a spacing between a supporting surface (11) of an interlocking clamp and a frame rail (1) to which the interlocking clamp is mounted. Thus, the tool can be inserted in a gap (15) between the frame rail (1) and the shield (4) and a wrench recess (16) fitted about an angled lug (8) forming a first element (5) of the interlocking clamp on a side facing away from a second clamp element (10). Wedge-shaped jaws (18 and 19), forming outwardly acute angles (17), defining the wrench recess can be pushed between the angled lug (8) of the first clamp element and forked clamping lugs (6 and 7) of a second clamp element (10). The tool allows for easy detaching of a protective shield.

8 Claims, 2 Drawing Sheets

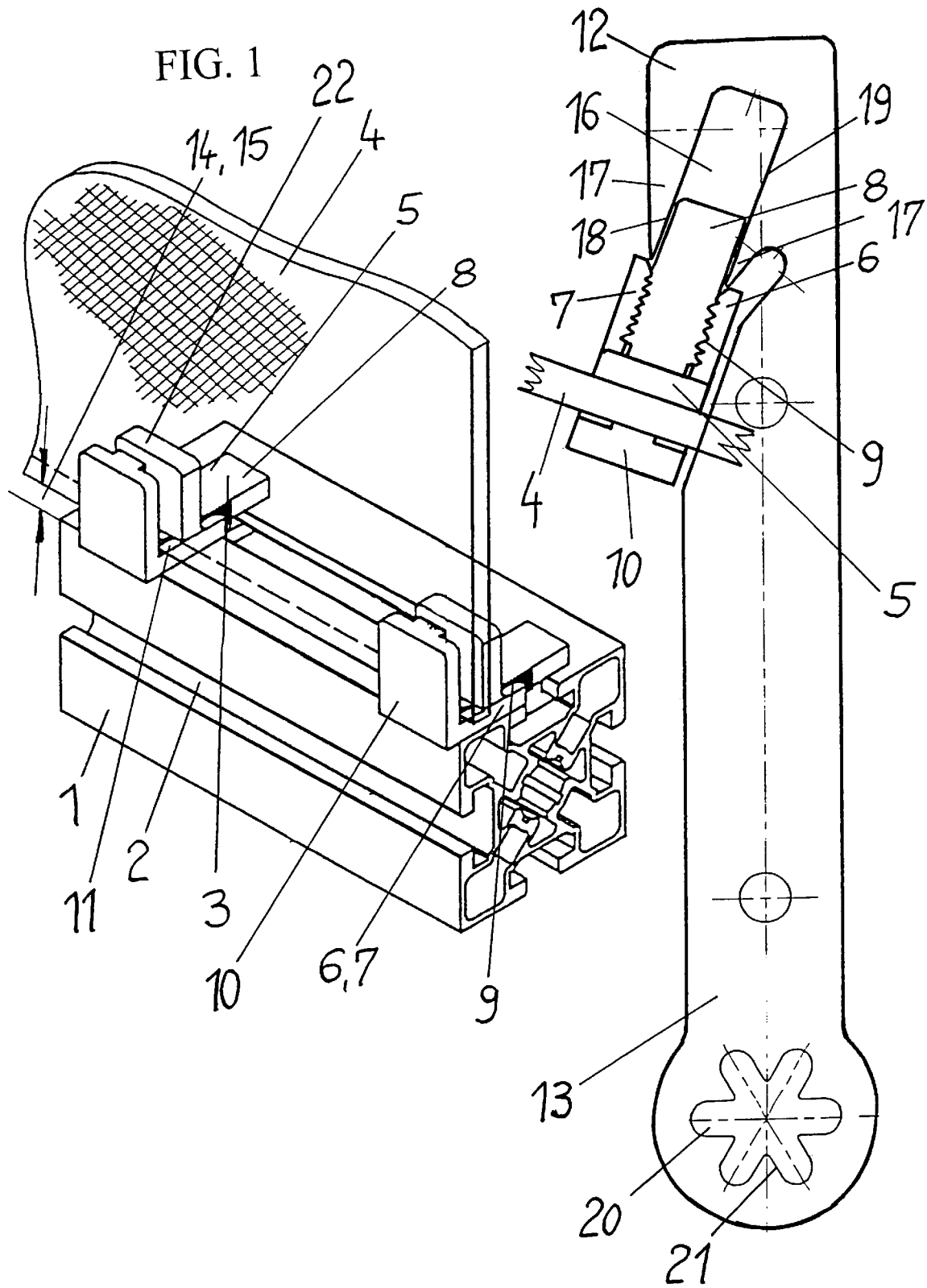

ATTACHING-DETACHING TOOL

BACKGROUND OF THE INVENTION

This invention relates to an attaching-detaching tool for plastic interlocking clamps for protective shields for manufacturing or processing equipment.

Interlocking clamps of this kind are currently available on the market and comprise a first clamp element engaged with a frame rail and a second clamp element having two forked clamping lugs, which, when the shield is in an intermediate position, is pushed along an angled lug of the first clamp element and locked thereto by notch knurls. The forked clamping lugs simultaneously form a supporting surface for the shield.

It has become apparent that when these interlocking clamps are used in conjunction with mounted protective shields, they are accessible only from a side that is located inside the processing equipment, making detaching them from the outside impossible. Moreover, tools that can be used for detaching the interlocking clamps are distinctly primitive, that is, they include screwdrivers, etc.

Therefore, it is an object of the invention to provide an attaching-detaching tool of the type mentioned in the opening paragraph above that allows attaching and detaching from outside, relative to processing equipment protected by the protective shield.

SUMMARY OF THE INVENTION

According to principles of the invention an attaching-detaching tool for plastic interlocking clamp elements for holding protective shields for manufacturing or processing equipment has a flat edge profile with a thickness less than a spacing between a shield-supporting surface of a clamp and a frame rail with which the clamp is engaged so that the tool can be inserted into a gap between the frame rail and the shield. The tool has a wrench recess for fitting about an angled lug of a first clamp element on a side facing away from a second clamp element, with wedge-shaped jaws forming outwardly-opening acute angles for being pushed between the angled lug of the first clamp element and forked clamping lugs of the second clamping element for spreading the forked clamping lugs.

BRIEF DESCRIPTION OF THE DRAWING

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

An exemplary protective shield arrangement for processing equipment as well as an attaching-detaching tool according to the invention are shown in the drawings. Both the arrangement and the tool are described below with reference to the drawing.

FIG. 1 is a cutaway three-dimensional representation of a protective shield mounted on a frame rail by interlocking clamp elements of a clamp;

FIG. 2 is a simplified top view of an attaching-detaching tool according to the invention being used to engage an interlocking clamp element holding a protective shield;

DESCRIPTION OF THE PREFERRED EMBODIMENT

Figure 3:
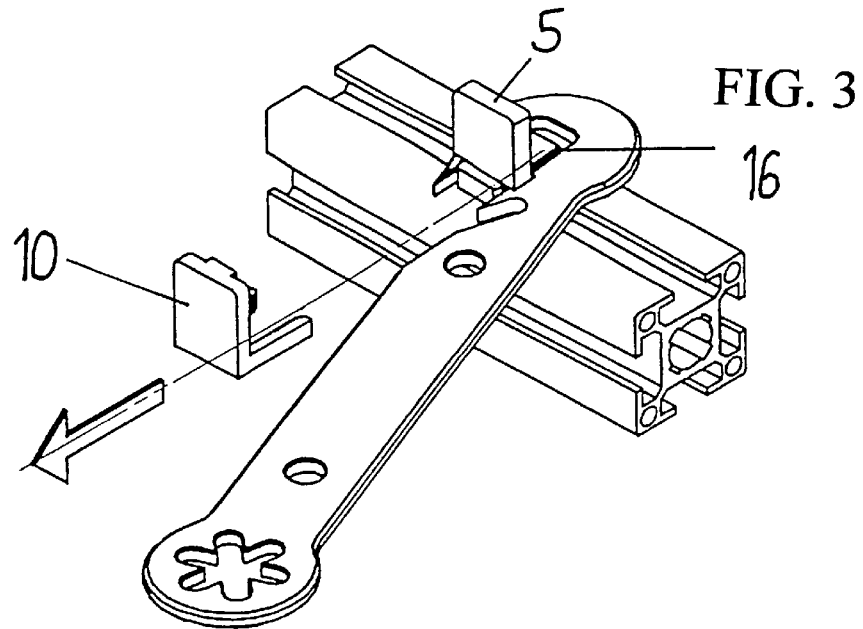
FIG. 3 is a segmented, exploded, isometric view of a tool of this invention being used to engage an interlocking clamp element on a frame rail, but without the shield being shown, with an open wrench recess.

FIG. 1 shows a section of a frame rail 1 having clamp-rail recesses 2 running lengthwise, having two plastic interlocking clamps 3 that hold in place a protective shield 4 which has the purpose of protecting processing or manufacturing equipment (not shown).

It can be seen that the interlocking clamps 3 include a first clamp element 5 which is engaged in the frame rail 1 and a second clamp element 10, whose two forked clamping lugs 6 and 7 are pushed along an angled lug 8 of the first clamp element 5, upon an intermediate positioning of the shield, and are locked there by notch knurls 9, whereby the forked clamping lugs 6 and 7 simultaneously form a supporting surface 11 for the shield 4.

As shown in FIG. 2, it is provided that an attaching-detaching tool 12 is structured to have a flat edge profile 13, having a thickness less than a spacing 14 between the supporting surface 11 and the frame rail 1, and is insertable into a gap 15 between the frame rail 1 and the shield 4.

The tool 12 has an open wrench recess 16 in an insertable section thereof for fitting about the angled lug 8 of the first clamp element 5 from a side thereof facing away from the second clamp element 10 and jaws 18 and 19 in the form of wedges forming outward acute angles 17 which can be pushed between the angled lug 8 and the forked clamping lugs 6 and 7 to spread the forked clamping lugs 6 and 7 so that a locking of the notch knurling 9 is released and the clamp element 10 as shown in FIG. 3 can be removed from the clamp element 5.

Figure 4:
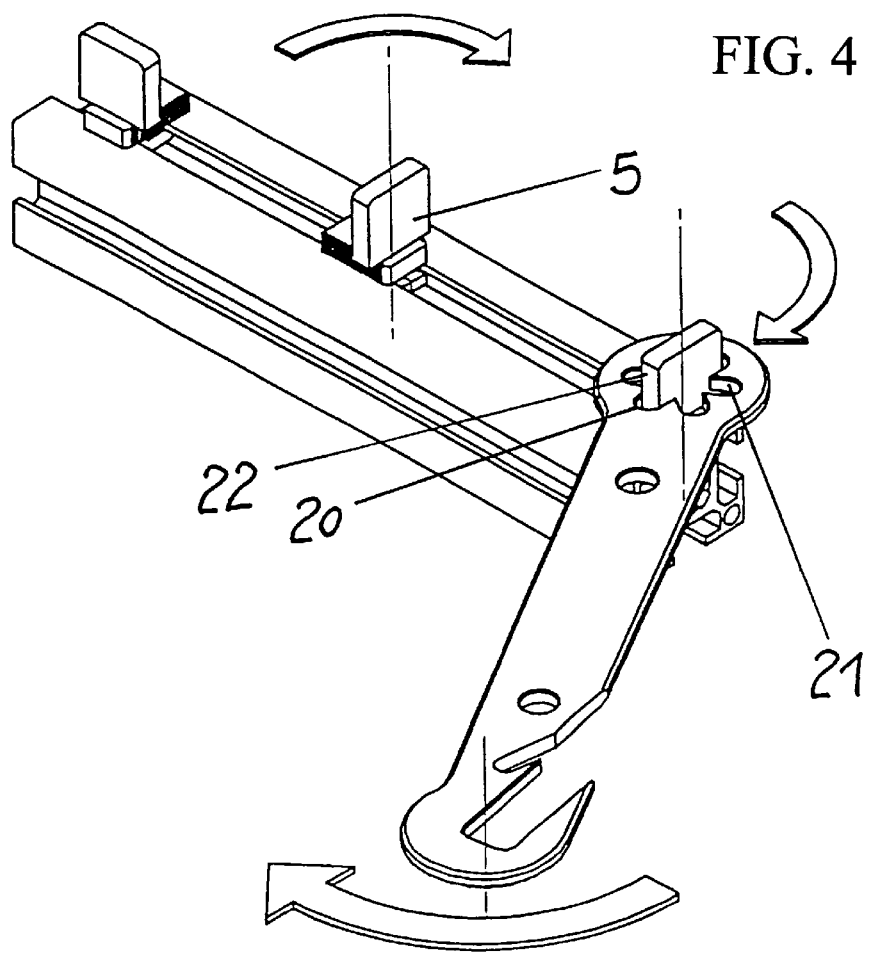
FIG. 4 is a view similar to FIG. 3, but there being a multiplicity of interlocking clamps being shown and a socket wrench recess of the tool being used.

This allows a desired detaching of the interlocking clamps 3 to occur easily from the outside. Advantageously, it is provided that the tool 12 also has a closed or socket wrench recess 20 with cross-shaped latching recesses 21, which can be placed onto another angled lug 22 of the first clamp element 5 for causing rotation of the first clamp element 5 into or out of a locked position, as shown in FIG. 4.

A structuring of an attaching-detaching tool according to the invention allows an easy detachment of a protective shield, whereby an attaching of the interlocking clamp itself is made possible through advantageous further development of the tool.

The invention claimed is:

1. An elongated attaching-detaching tool for use with plastic interlocking clamps of a type for holding a protective shield for equipment on a frame rail, with each of the interlocking clamps comprising a first clamp element which is engaged in the frame rail and a second clamp element having two forked clamping lugs which are pushed along opposite sides of an angled lug of the first clamp element, with the shield being between the first and second clamp elements to be held therebetween, the first and second clamped elements being locked together by inter-engagement between the forked clamping lugs and the sides of the angled lug, and with the forked clamping lugs also forming a supporting surface for the shield, said tool comprising:

an elongated flat wrench member having first and second ends, said elongated flat wrench member having a flat edge profile with a small thickness, said elongated flat member defining an open first wrench recess adjacent the first end, said open first wrench recess having an opening bounded by first and second wedge-shaped jaws forming outwardly pointed acute angles, with said open first wrench recess extending into said elongated flat member from said first and second wedge-shaped jaws toward said first end;

whereby said wrench member can be inserted into a spacing between the supporting surface and the frame rail, and thereby into a gap between the frame rail and the shield, from a side of the shield on which the second clamp element is located and manipulated so that the angled lug of the first clamp element enters the open first wrench recess from a side of the angled lug facing away from the second clamp element, with the first and second wedge-shaped jaws being forced between the angled lug and the forked clamping lugs to spread the forked clamping lugs and cause them to release the angled lug.

2. The tool as in claim 1, wherein said elongated flat wrench member has a closed second wrench recess with cross-shaped latching sub-recesses adjacent the second end of said elongated flat wrench member which can be placed onto the first clamp element for engaging and rotating the first clamp element into and out of a locked position in the frame rail.

3. The tool as in claim 1, wherein said elongated flat wrench member further defines an open auxiliary recess extending into said elongated flat wrench member on an opposite side of said second wedge-shaped jaw from said open wrench recess;

whereby, when said first wedge-shaped jaw spreads one of said clamping lugs from said angled lug, said one of said clamping lugs is received in said open auxiliary recess.

4. A combination comprising an attaching-detaching tool, a frame rail, a plastic interlocking clamp and a protective shield, the interlocking clamp comprising a first clamp element which is engaged in the frame rail and a second clamp element having two forked clamping lugs which are pushed along opposite sides of an angled lug of the first clamp element, with the shield being between the first and second clamp elements, the first and second clamp elements being locked together by inter-engagement between the two forked clamping lugs and the sides of the angled lug, and with the forked clamping lugs also forming a supporting surface for the shield, with the attaching-detaching tool being structured as an elongated flat wrench member having a flat edge profile with a thickness less than a spacing between the supporting surface and the frame rail so that the elongated flat wrench member can be inserted into a gap between the frame rail and the shield, said tool defining a wrench recess for fitting about the angled lug of the first clamp element on the side facing away from the second clamp element, and first and second wedge-shaped jaws forming outward acute angles for being forced between the angled lug and the forked clamping lugs to spread the forked clamping lugs.

5. The tool as in claim 4, wherein said tool has a closed second wrench recess with cross-shaped latching sub-recesses which can be placed onto the first clamp element for engaging and rotating the first clamp element into and out of a locked position.

6. A combination as in claim 4, wherein said open first wrench recess is adjacent to a first end of the elongated flat wrench member, with said open first wrench recess extending into said elongated flat member from an opening at said wedge-shaped jaws toward said first end.

7. The tool as in claim 4, wherein said tool further defines an open auxiliary recess extending into said elongated flat wrench member on an opposite side of said second wedge-shaped jaw from said open first wrench recess;

whereby, when said first wedge-shaped jaw spreads one of said clamping lugs from said angled lug, said one of said clamping lugs is received in said open auxiliary recess.

8. An elongated attaching-detaching tool for use with plastic interlocking clamps of a type for holding a protective shield for equipment on a frame rail, with each of the interlocking clamps comprising a first clamp element which is engaged in the frame rail and a second clamp element having two forked clamping lugs which are pushed along opposite sides of an angled lug of the first clamp element, with the shield being between the first and second clamp elements to be held therebetween, the first and second clamped elements being locked together by inter-engagement between the forked clamping lugs and the sides of the angled lug, and with the forked clamping lugs also forming a supporting surface for the shield, said tool comprising:

an elongated flat wrench member having first and second ends, said elongated flat wrench member having a flat edge profile with a small thickness, said elongated flat member defining an open first wrench recess adjacent the first end, said open first wrench recess having an opening bounded by first and second wedge-shaped jaws forming outwardly pointed acute angles, with said open first wrench recess extending into said elongated flat member from said first and second wedge-shaped jaws;

whereby said wrench member can be inserted into a spacing between the supporting surface and the frame rail, and thereby into a gap between the frame rail and the shield, from a side of the shield on which the second clamp element is located and manipulated so that the angled lug of the first clamp element enters the open first wrench recess, with the first and second wedge-shaped jaws being forced between the angled lug and the forked clamping lugs to spread the forked clamping lugs and cause them to release the angled lug.

* * * * *